United States Patent
Kaneko

(10) Patent No.: US 9,405,909 B2
(45) Date of Patent: Aug. 2, 2016

(54) NON-TRANSITORY COMPUTER-READABLE RECORDING MEDIUM AND INFORMATION PROCESSING APPARATUS INCLUDING SHARED LIBRARY THAT PREVENTS UNAUTHORIZED USE

(71) Applicant: Kyocera Document Solutions Inc., Osaka (JP)

(72) Inventor: Kotaru Kaneko, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 14/190,467

(22) Filed: Feb. 26, 2014

(65) Prior Publication Data

US 2014/0245456 A1 Aug. 28, 2014

(30) Foreign Application Priority Data

Feb. 28, 2013 (JP) .................................. 2013-039366

(51) Int. Cl.
  *G06F 21/57* (2013.01)
  *G06F 21/12* (2013.01)
  *G06F 21/62* (2013.01)

(52) U.S. Cl.
  CPC .............. *G06F 21/57* (2013.01); *G06F 21/121* (2013.01); *G06F 21/629* (2013.01); *G06F 2221/2141* (2013.01)

(58) Field of Classification Search
  CPC ...... G06F 21/57; G06F 21/629; G06F 21/121
  See application file for complete search history.

(56) References Cited

U.S. PATENT DOCUMENTS

| | | | | |
|---|---|---|---|---|
| 5,673,315 | A * | 9/1997 | Wolf .................... | G06F 9/44521 705/59 |
| 5,974,470 | A * | 10/1999 | Hammond .......... | G06F 9/44521 707/999.202 |
| 6,105,069 | A * | 8/2000 | Franklin ................ | G06F 21/10 709/217 |
| 7,284,124 | B1 * | 10/2007 | Ginsberg ....................... | 713/167 |
| 7,685,596 | B1 * | 3/2010 | Webb ........................ | G06F 8/61 717/127 |

(Continued)

FOREIGN PATENT DOCUMENTS

EP      2439673 A2 *  4/2012

OTHER PUBLICATIONS

Feng, Wang Wei; Hong, Yang Zhao; Yan, Sun; "Study and Realization of Generic mechanism for Dynamic Loading Model Components in Simulation System", International Forum on Computer Science-Technology and Applications, Dec. 25-27, 2009, pp. 113-116.*

(Continued)

*Primary Examiner* — Victor Lesniewski
(74) *Attorney, Agent, or Firm* — K&L Gates LLP

(57) ABSTRACT

A non-transitory computer-readable recording medium includes a shared library that is executed by a processor. The shared library includes a preprocessing function and a function. The function causes the processor to execute a process if a value, as an execution result of the preprocessing function, is valid, and not to execute the process if the value is invalid. The preprocessing function causes the processor to acquire encrypted unique information from the storage device, to decrypt the unique information, to acquire, from the storage device, specific information that specifies an application using the shared library, and to return the value that is valid or invalid based on a comparison between the specific information and the decrypted unique information.

2 Claims, 8 Drawing Sheets

(56) References Cited

U.S. PATENT DOCUMENTS

| | | | |
|---|---|---|---|
| 8,090,943 B1* | 1/2012 | Tran | 713/167 |
| 8,707,444 B2* | 4/2014 | Kelly et al. | 726/26 |
| 2002/0026505 A1* | 2/2002 | Terry | G06F 21/52 709/221 |
| 2002/0026605 A1* | 2/2002 | Terry | G06F 21/53 714/37 |
| 2002/0032868 A1 | 3/2002 | Yamamoto et al. | |
| 2002/0174359 A1* | 11/2002 | Haltmeyer | 713/200 |
| 2003/0028809 A1* | 2/2003 | Goodman et al. | 713/201 |
| 2003/0200449 A1* | 10/2003 | Droege et al. | 713/189 |
| 2004/0123270 A1* | 6/2004 | Zhuang et al. | 717/118 |
| 2005/0050315 A1* | 3/2005 | Burkhardt | G06F 21/123 713/150 |
| 2005/0060725 A1* | 3/2005 | D'Souza | G06F 9/44536 719/331 |
| 2005/0120237 A1* | 6/2005 | Roux et al. | 713/200 |
| 2005/0216745 A1* | 9/2005 | Speare | G06Q 10/107 713/182 |
| 2005/0216901 A1* | 9/2005 | Speare | G06F 21/606 717/168 |
| 2006/0036851 A1* | 2/2006 | DeTreville | 713/159 |
| 2006/0070052 A1* | 3/2006 | Miyamoto et al. | 717/162 |
| 2008/0004886 A1* | 1/2008 | Hames et al. | 705/1 |
| 2009/0165132 A1* | 6/2009 | Jain et al. | 726/22 |
| 2010/0199357 A1* | 8/2010 | Hoffman et al. | 726/27 |
| 2013/0054960 A1* | 2/2013 | Grab et al. | 713/155 |
| 2013/0287208 A1* | 10/2013 | Chong et al. | 380/44 |
| 2013/0290729 A1* | 10/2013 | Pettigrew et al. | 713/187 |
| 2014/0173071 A1* | 6/2014 | Hazen et al. | 709/223 |

OTHER PUBLICATIONS

Zandy, Victor C.; Miller, Barton P.; Livny, Miron; "Process Hijacking", The Eighth International Symposium on High Performance Distributed Computing, Aug. 3-6, 1999, pp. 177-184.*

* cited by examiner

NON-TRANSITORY COMPUTER-READABLE RECORDING MEDIUM AND INFORMATION PROCESSING APPARATUS INCLUDING SHARED LIBRARY THAT PREVENTS UNAUTHORIZED USE

INCORPORATION BY REFERENCE

This application is based upon, and claims the benefit of priority from, corresponding Japanese Patent Application No. 2013-039366, filed in the Japan Patent Office on Feb. 28, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to a non-transitory computer-readable recording medium and an information processing apparatus including a shared library that prevents unauthorized use of it.

BACKGROUND

In a typical configuration wherein functions commonly used among a plurality of applications are provided as a shared library that is dynamically linked to the applications during application execution, if a function in the shared library is corrected, for example, each application that uses the function is also modified. This improves the maintainability of the applications. For example, in Windows (registered trademark), a dynamic link library with an extension of "dll" is a shared library.

If functions used in common by the plurality of applications are provided as a shared library, however, applications from, for example, a competing company can also use the functions. Accordingly, it is necessary to prevent unauthorized use of the shared library.

In the typical system to prevent unauthorized use of a shared library, if there is no specific software development tool at a stage at which an executable program file in which an object in a library is embedded is developed, control is performed so that protect codes that are appropriately associated cannot be embedded in the library and executable program file. Furthermore, in the above system, upon execution of the object, a protect code check function is executed and, if the protect code in the library and the protect code in the executable program file are not appropriately associated, control is performed so that execution of the program is terminated.

In a typical information processing apparatus, an object in a library is retrieved for each application to generate an executable program file. Therefore, the library in the typical information processing apparatus is not an ordinary shared library; when an object in the library is corrected, the corrected object needs to be embedded in each application. Another problem with the typical information processing apparatus is that the configuration to protect the shared library is complex.

SUMMARY

The present disclosure relates to a non-transitory computer-readable recording medium and an information processing apparatus having a shared library that prevents unauthorized use of it using a simple configuration.

According to an embodiment of the present disclosure, a non-transitory computer-readable recording medium includes a shared library that is executed by a processor. The shared library includes a preprocessing function and a function. The function causes the processor to execute the process if a value, as an execution result of the preprocessing function, is valid, and not to execute the process if the value is invalid. The preprocessing function causes the processor to acquire encrypted unique information from the storage device, to decrypt the unique information, to acquire, from the storage device, specific information that specifies an application using the shared library, and to return the value that is valid or invalid based on a comparison between the specific information and the decrypted unique information.

According to an embodiment of the present disclosure, an information processing apparatus includes a processor, a storage device, and a shared library that is stored in the storage device and executed by the processor. The shared library includes a preprocessing function and a function. The function causes the processor to execute the process if a value, as an execution result of the preprocessing function, is valid, and not to execute the process if the value is invalid. The preprocessing function causes the processor to acquire encrypted unique information from the storage device, to decrypt the unique information, to acquire, from the storage device, specific information that specifies an application using the shared library, and to return the value that is valid or invalid based on a comparison between the specific information and the decrypted unique information.

Additional features and advantages are described herein, and will be apparent from the following Detailed Description and the figures.

BRIEF DESCRIPTION OF THE FIGURES

All drawings are intended to illustrate aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
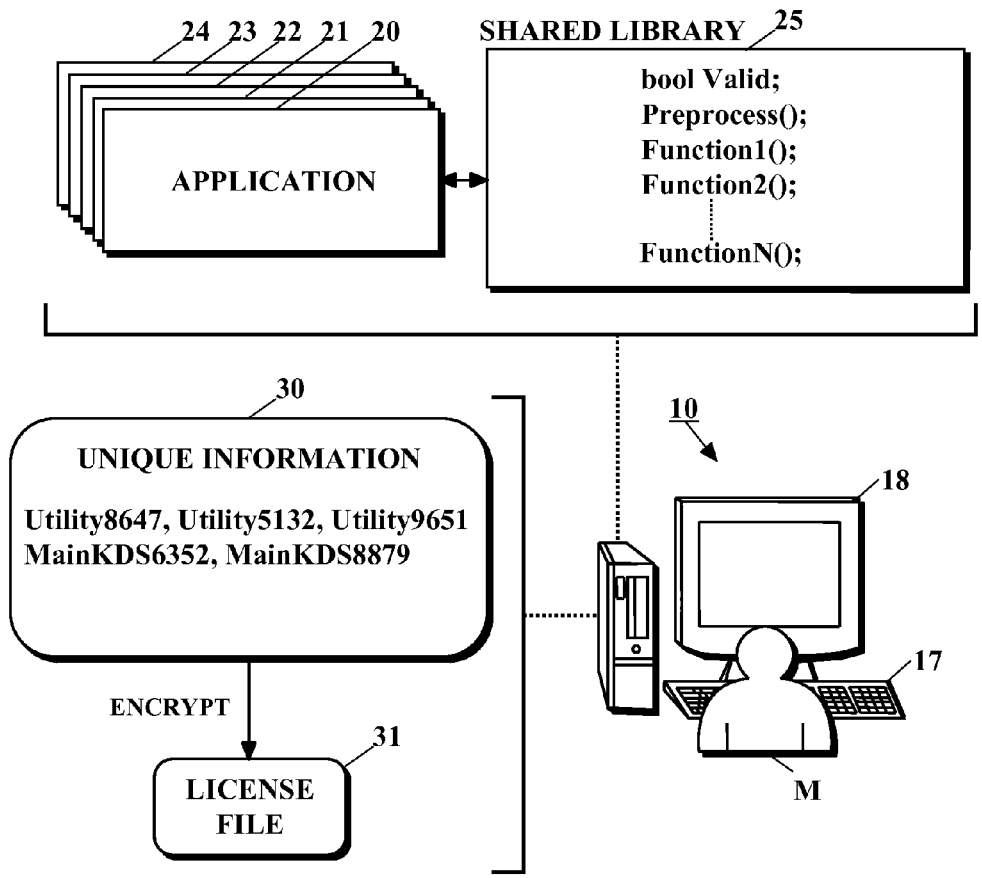
FIG. 1 is a schematic diagram illustrating generation of a license file for a shared library in an embodiment of the present disclosure.

FIG. 1 is a schematic diagram illustrating generation of a license file for a shared library, in an embodiment of the present disclosure, that has the capability of preventing unauthorized use of the shared library. This license file is generated by a developer M on a personal computer (PC) 10, which is used as an information processing apparatus.

Figure 2:
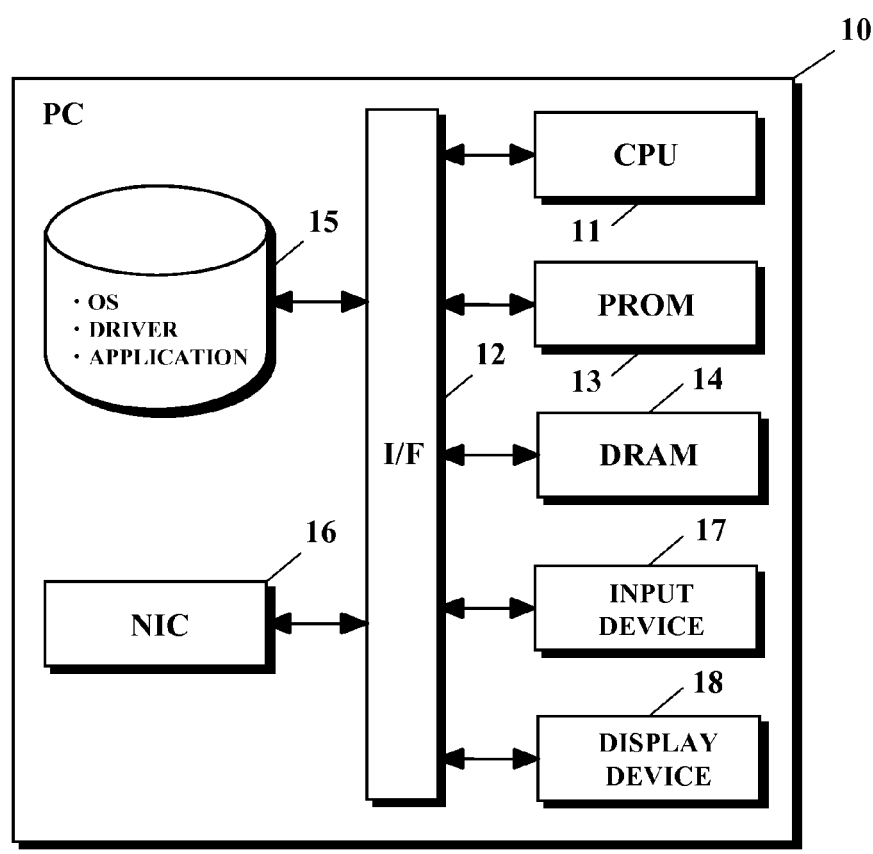
FIG. 2 is a block diagram illustrating the hardware configuration of the information processing apparatus in FIG. 1.

FIG. 2 is a block diagram illustrating the hardware configuration of the PC 10.

In the hardware configuration of the PC 10, a central processing unit (CPU) 11 is connected to a programmable read-only memory (PROM) 13, a dynamic random-access memory (DRAM) 14, an auxiliary storage device 15, a network interface 16, an input device 17, and a display device 18 via an interface 12. In FIG. 2, a plurality of interfaces are represented as a single block 12.

The PROM 13 is, for example, a flash memory; it stores basic input/output system (BIOS). The DRAM 14 is used as a main storage unit in a virtual storage system. The auxiliary storage device 15 stores an operating system (OS), various types of drivers, an integrated software development environment, applications developed in this environment, source code of a library, and the like. The input device 17 includes, for example, a keyboard and a pointing device.

Referring again to FIG. 1, functions used in common by a plurality of applications 20 to 24 are handled as a shared library 25. When an application is executed, a capability of the OS dynamically links the shared library 25 to the application.

In the configuration illustrated in FIG. 1, when one of the functions in the shared library 25 is corrected, the applications 20 to 24 that use the corrected function have the same effect as being corrected. This improves the maintainability of the applications.

Since, however, the shared library 25 can also be used by other applications, it is necessary to prevent unauthorized use of the shared library 25.

Thus, the developer M operates the input device 17 of the PC 10 to obtain, as unique information 30, a set of specific information items about the applications 20 to 24 that use the shared library 25. The developer M also generates a license file 31 in which the unique information 30 has been encrypted.

Figure 3:
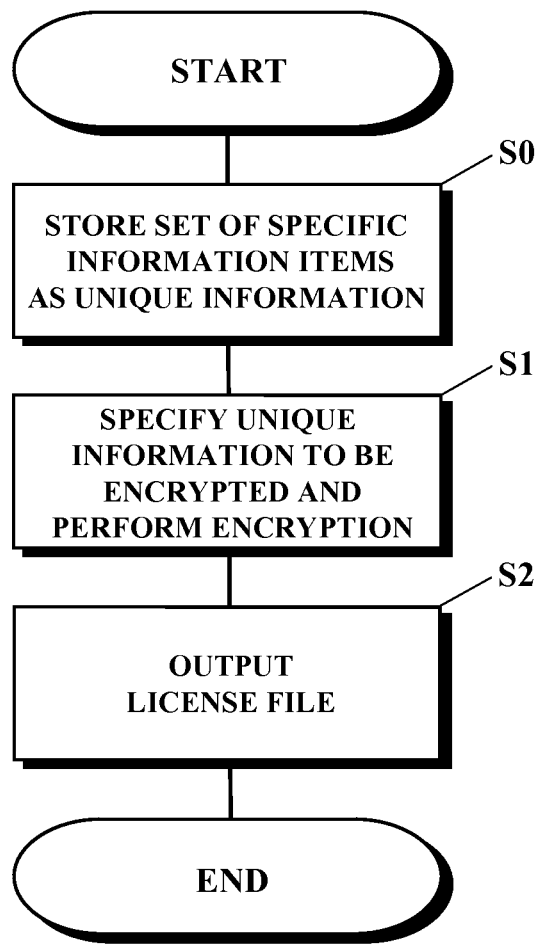
FIG. 3 is a flowchart illustrating a method of encrypting the unique information in FIG. 1.

FIG. 3 is a flowchart illustrating a method of encrypting the unique information 30.

In step S0, the developer M operates the input device 17 to copy specific information items about the applications 20 to 24 from their source code to a text file via a copy-and-paste operation, and store a set of the specific information items as the unique information 30.

The specific information indicates that the application has a valid right to use the shared library 25. The specific information includes application identification information that identifies the relevant application of the applications 20 to 24. The application identification information includes at least one of a name of a class, the name of function included in the application, a specific code included in the application, the name of a package of the application, the name of a main program of the application, and the codes obtained after the application has been compiled to binary format.

Even if applications have the same application name, when their versions differ, the contents of the shared library 25 that these applications use may differ. To allow for this situation, the specific information also includes application version identification information. The applications 20 to 24 are identified by the logical conjunction of the application version identification information and application identification information.

In step S1, to generate the license file 31, the developer M activates an encryption program, specifies the unique information 30 as a target to be encrypted, enters a password used as an encryption key, and performs encryption. In step S2, the developer M outputs the license file 31.

Figure 4:
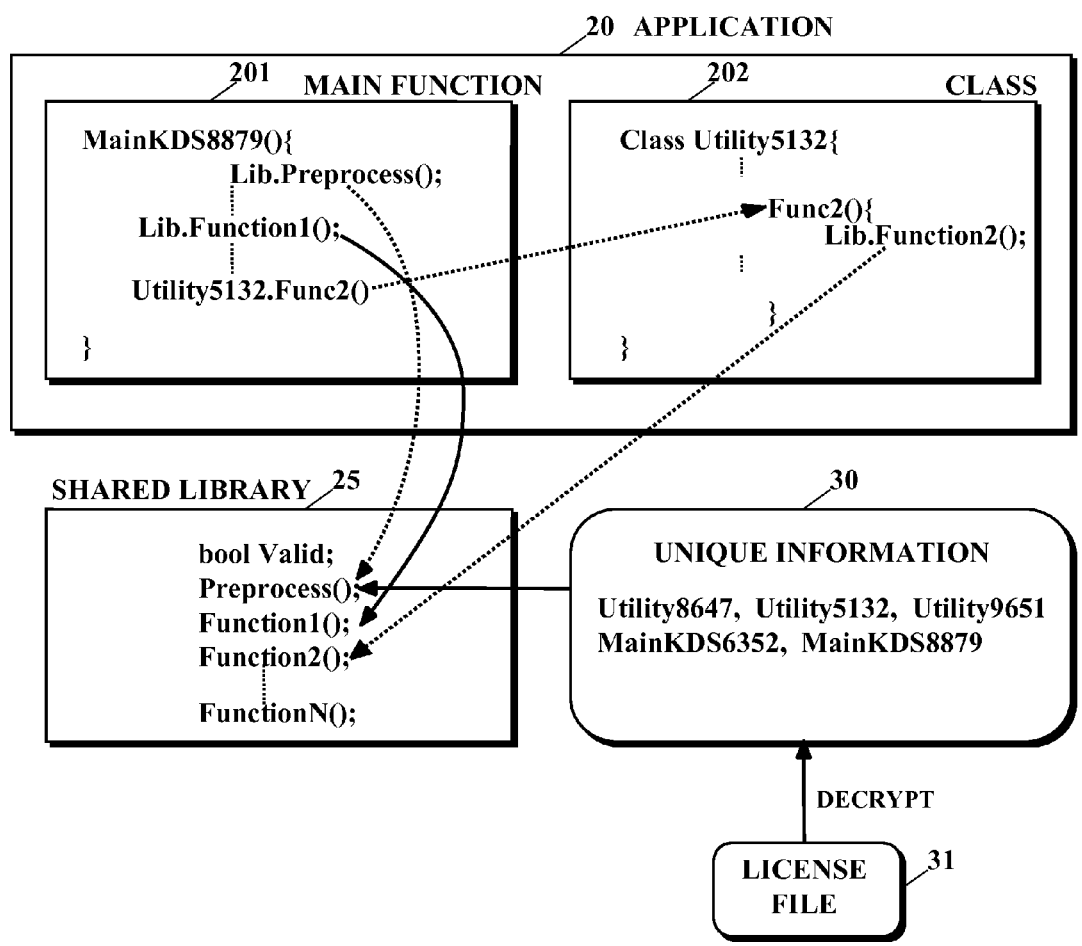
FIG. 4 is a schematic diagram illustrating an operation performed after the shard library has been dynamically linked to an application.

FIG. 4 is a schematic diagram illustrating an operation performed after the application 20 has been activated and the shared library 25 has been dynamically linked to the application 20 by the dynamic linking capability of the OS.

The application 20 includes a main function 201 and a class 202. The main function 201 directly uses the shared library 25 or uses it via a function in the class 202.

Figure 5:
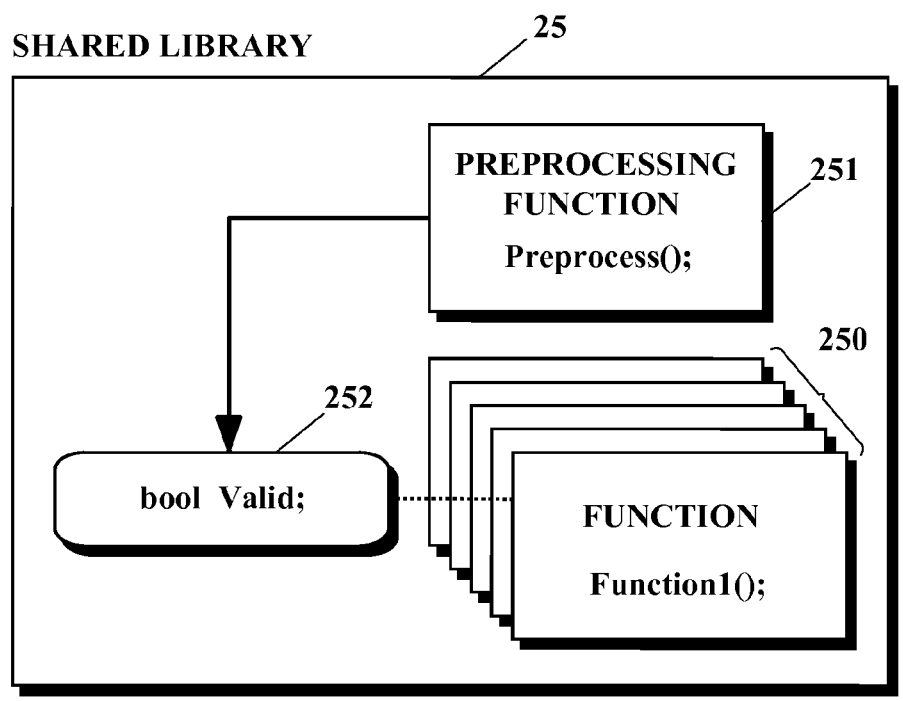
FIG. 5 is a schematic diagram illustrating the configuration of the shared library in FIG. 4.

FIG. 5 is a schematic diagram illustrating the configuration of the shared library 25.

The shared library 25 includes functions (methods in the class) 250, which are used in common by a plurality of applications, a preprocessing function 251 (preprocess), which enables the functions 250 to be used, and a variable 252 (Valid), which indicates a processing result of the preprocessing function 251.

Figure 6:
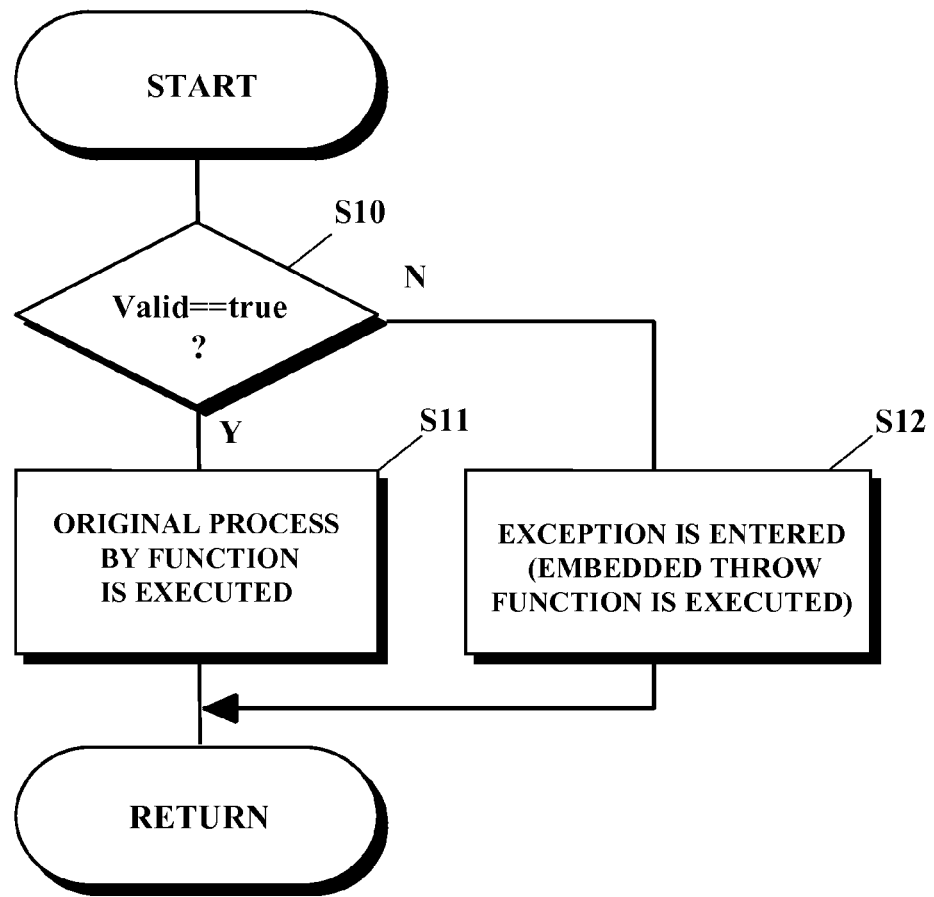
FIG. 6 is a flowchart illustrating the operation of each of the functions in FIG. 5.

FIG. 6 is a flowchart illustrating the operation of each of the functions 250.

If variable Valid is true in step S10, the sequence proceeds to step S11. If the variable Valid is not true, the sequence proceeds to step S12.

In step S11, the original process by the function is executed, after which the sequence returns. Thus, the capability of the function is implemented.

In step S12, an exception is entered. That is, an embedded throw function is executed to abnormally terminate the function.

Therefore, to have the process in step S11 executed, variable Valid, the initial value of which is false, needs to become true. The variable Valid can be made true by the preprocessing function 251 illustrated in FIG. 5.

Figure 7:
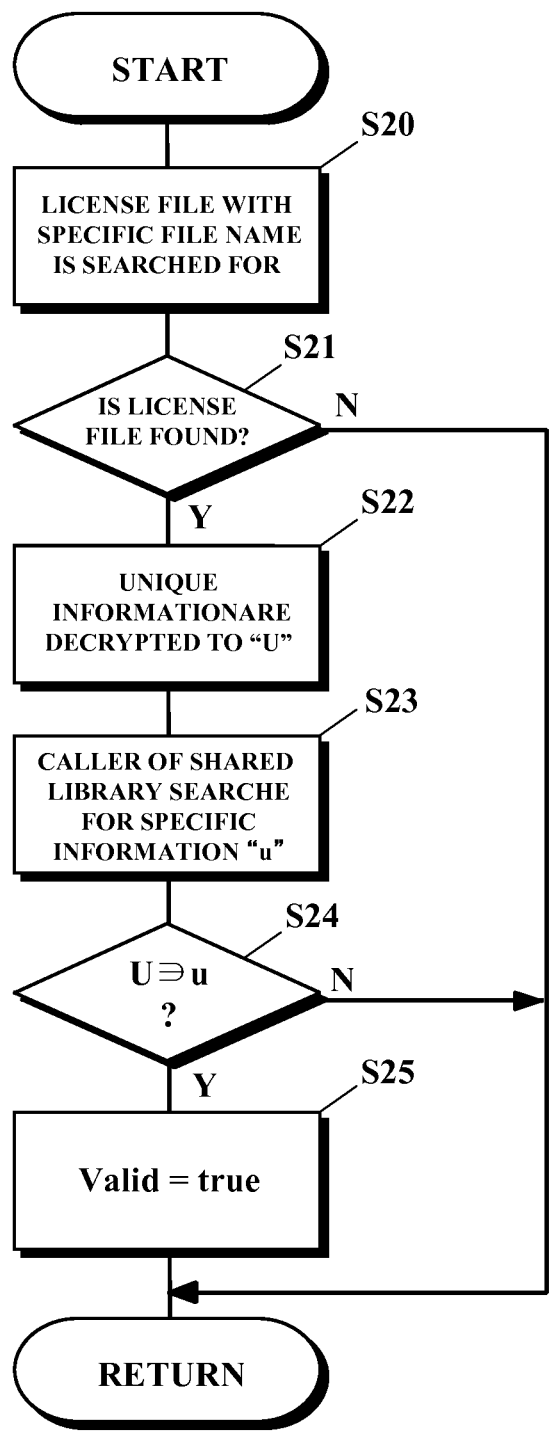
FIG. 7 is a flowchart illustrating the operation of the preprocessing function in FIG. 5.

FIG. 7 is a flowchart illustrating the operation of the preprocessing function 251.

In step S20, files names in a specific directory such as, for example, a directory including the shared library 25 are sequentially read. While the file names are read, the license file 31 with a specific file name assigned by the developer M is searched for.

If the license file 31 is found in step S21, the sequence proceeds to step S22. If the license file 31 is not found, the sequence returns. That is, if the license file 31 is not found, variable Valid remains to be false.

In step S22, the contents of the license file 31, that is, unique information, are decrypted to "U". In this decryption, the password that has been entered in step S1 (encryption of unique information) is used as a decryption key. Therefore, the password is directly embedded in the preprocessing function 251 or is transferred to the preprocessing function 251. Alternatively, the place at which the password is stored is embedded in the preprocessing function 251 or is transferred to the preprocessing function 251.

In step S23, a caller of the shared library 25 searches for specific information "u", which is an element of the unique information U, and acquires the specific information u. That is, the application 20 is regarded as binary data, and whether the binary data includes the specific information u is checked. If the specific information u is included, the binary data is retained.

If the specific information u is determined to be an element of the unique information U in step S24, the sequence proceeds to step S25. If the specific information u is not determined to be an element of the unique information U, the sequence returns. Before this determination, the formats of the specific information u and unique information U are unified. If, for example, the unique information U is text and the specific information u is binary code corresponding to text, the unique information U is converted to binary code corresponding to text. Alternatively, the specific information u is converted to text corresponding to binary code.

In step S25, true is assigned to variable Valid, and the sequence returns.

Referring again to FIG. 4, the main function 201 first calls the preprocessing function 251 and determines the value of variable Valid. When the main function 201 calls a function in the shared library 25 after that, only if variable Valid is found to be true in the process illustrated in FIG. 6, the process by the function is executed.

Figure 8:
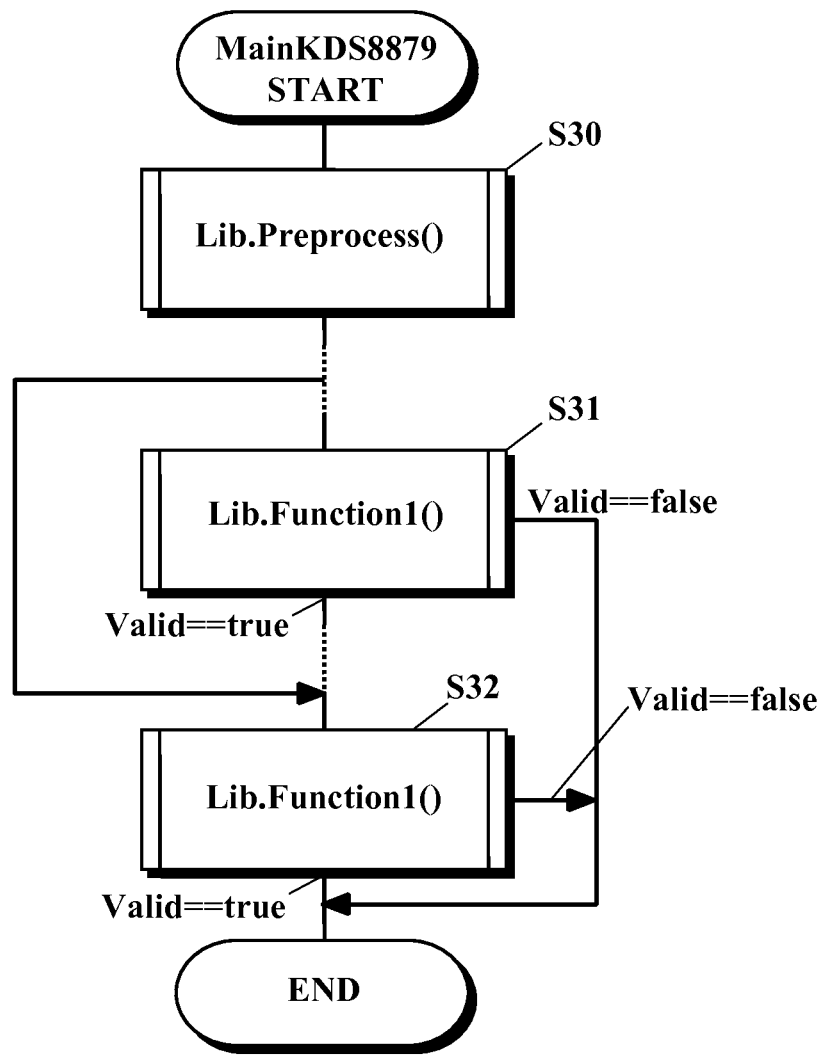
FIG. 8 is a flowchart illustrating process performed by the main function in FIG. 4.

FIG. 8 is a flowchart illustrating the process performed by the main function 201.

In step S30, the preprocessing function 251 is called and the value of variable Valid is determined.

In step S31, one of the functions 250 in the shared library 25 is called. If variable Valid is true, the main body of the called function is executed. If the variable Valid is not true, an exception is entered and the function is abnormally terminated.

In step S32 as well, the process is performed as in step S31.

Thus, the license file 31 enables the shared library 25 to be used only by the applications 20 to 24 permitted by the developer M, preventing unauthorized use of the shared library 25.

While various aspects and embodiments have been disclosed herein, other aspects and embodiments are possible. Other designs may be used in which the above-described components are each present.

A combination of a plurality of data items included in each application, for example, may be used as the specific information.

Alternatively, a random number that the developer has embedded in the application, for example, may be used as the specific information.

Alternatively, part of data extracted from image data included in the application, for example, may be used as the specific information.

Alternatively, a set of specific information items in a plurality of applications, for example, may be used as the unique information.

Alternatively, the specific information may include, for example, specific information about an application that is planned to be developed in the future.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention is claimed as follows:

1. A non-transitory computer-readable recording medium comprising a shared library that is executed by a processor included in an information processing apparatus,
   wherein the shared library includes i) functions being used commonly by a plurality of applications, ii) a preprocessing function enabling the functions to be used, and iii) a variable indicating a processing result of the preprocessing function, wherein
   when an application is executed, an operating system included in the information processing apparatus dynamically links the shared library to the application, and
   when one of the functions in the shared library is corrected, the plurality of applications using the corrected function have the same effect as being corrected,
   wherein the functions are configured to cause the processor:
   to execute a process if the variable indicating the processing result of the preprocessing function is valid, and not to execute the process if the variable indicating the processing result of the preprocessing function is invalid,
   wherein the preprocessing function is configured to cause the processor:
   to read file names in a specific directory including the shared library and to search for a license file with a specific file name assigned by a developer;
   to acquire encrypted unique information in the license file from a storage device included in the information processing apparatus,
   wherein the license file is generated by encrypting the unique information using a password as an encryption key,
   wherein the unique information in the license file is stored in the storage device by copying specific information items about the plurality of applications from their source code to a text file and storing a set of the specific information items,
   wherein the specific information items indicate that the application has a valid right to use the shared library, and include at least one of application identification information that identifies each of the plurality of applications, a combination of a plurality of data items included in the plurality of applications, a random number embedded by the developer in the application, and part of data extracted from image data included in the application,
   wherein the application identification information includes at least one of a name of a class, a name of function included in the application, a specific code included in the application, a name of a package of the application, a name of a main program of the application, and a specific code obtained after the application has been compiled to binary format, and
   wherein, if the plurality of applications have a same application name and their versions differ, the specific information further includes application version identification information, and the plurality of applications are identified by the logical conjunction of the application version identification information and the application identification information;
   to decrypt the unique information in the license file using the password as a decryption key, which is entered as the encryption key, wherein one of the password and a place at which the password is stored, is one of i) directly embedded in the preprocessing function and ii) transferred to the preprocessing function;
to search for the specific information and acquire the specific information by a caller of the shared library; and
to return the variable indicating the processing result of the preprocessing function that is valid or invalid based on a comparison between the acquired specific information by the caller of the shared library and the decrypted unique information in the license file,
wherein, if the acquired specific information is determined to be an element of the decrypted unique information, the variable is valid,
wherein, if the acquired specific information is not determined to be the element of the decrypted unique information, the variable is invalid, and
wherein, if the unique information is a text and the specific information is a binary code corresponding to the text, the unique information is converted to the binary code corresponding to the text or the specific information is converted to the text corresponding to the binary code.

2. An information processing apparatus comprising:
a processor,
a storage device, and
a shared library that is stored in the storage device and executed by the processor,
the shared library including i) functions being used commonly by a plurality of applications, ii) a preprocessing function, and iii) a variable indicating a processing result of the preprocessing function, wherein,
when an application is executed, an operating system included in the information processing apparatus dynamically links the shared library to the application, and
when one of the functions in the shared library is corrected, the plurality of applications using the corrected function have the same effect as being corrected,
the functions are configured to cause the processor:
to execute a process if the variable indicating the processing result of the preprocessing function is valid, and not to execute the process if the variable indicating the processing result of the preprocessing function is invalid, and
the preprocessing function is configured to cause the processor:
to read file names in a specific directory including the shared library and to search for a license file with a specific file name assigned by a developer;
to acquire encrypted unique information in the license file from the storage device,
wherein the license file is generated by encrypting the unique information by using a password as an encryption key,
wherein the unique information in the license file is stored in the storage device by copying specific information items about the plurality of applications from their source code to a text file and storing a set of the specific information items,
wherein the specific information items indicate that the application has a valid right to use the shared library, and include at least one of application identification information that identifies each of the plurality of applications, a combination of a plurality of data items included in the plurality of applications, a random number embedded by the developer in the application, and part of data extracted from image data included in the application,
wherein the application identification information includes at least one of a name of a class, a name of function included in the application, a specific code included in the application, a name of a package of the application, a name of a main program of the application, and a specific code obtained after the application has been compiled to binary format, and
wherein, if the plurality of applications have a same application name and their versions differ, the specific information further includes application version identification information, and the plurality of applications are identified by the logical conjunction of the application version identification information and the application identification information;
to decrypt the unique information in the license file using the password as a decryption key, which is entered as the encryption key,
wherein one of the password and a place at which the password is stored, is one of i) directly embedded in the preprocessing function and ii) transferred to the preprocessing function;
to search for the specific information and acquire the specific information by a caller of the shared library; and
to return the variable indicating the processing result of the preprocessing function that is valid or invalid based on a comparison between the acquired specific information by the caller of the shared library and the decrypted unique information in the license file,
wherein, if the acquired specific information is determined to be an element of the decrypted unique information, the variable as the execution result of the preprocessing function is valid,
wherein, if the acquired specific information is not determined to be the element of the decrypted unique information, the variable is invalid, and
wherein, if the unique information is a text and the specific information is a binary code corresponding to the text, the unique information is converted to the binary code corresponding to the text or the specific information is converted to the text corresponding to the binary code.

* * * * *